No. 803,997. PATENTED NOV. 7, 1905.
H. F. DUNN.
COMPUTING DEVICE FOR CHEESE CUTTERS.
APPLICATION FILED APR. 27, 1904.

2 SHEETS—SHEET 1.

WITNESSES:
C. Hoen.
N. Allemong

INVENTOR.
Henry F. Dunn
BY V. H. Lockwood
ATTORNEY.

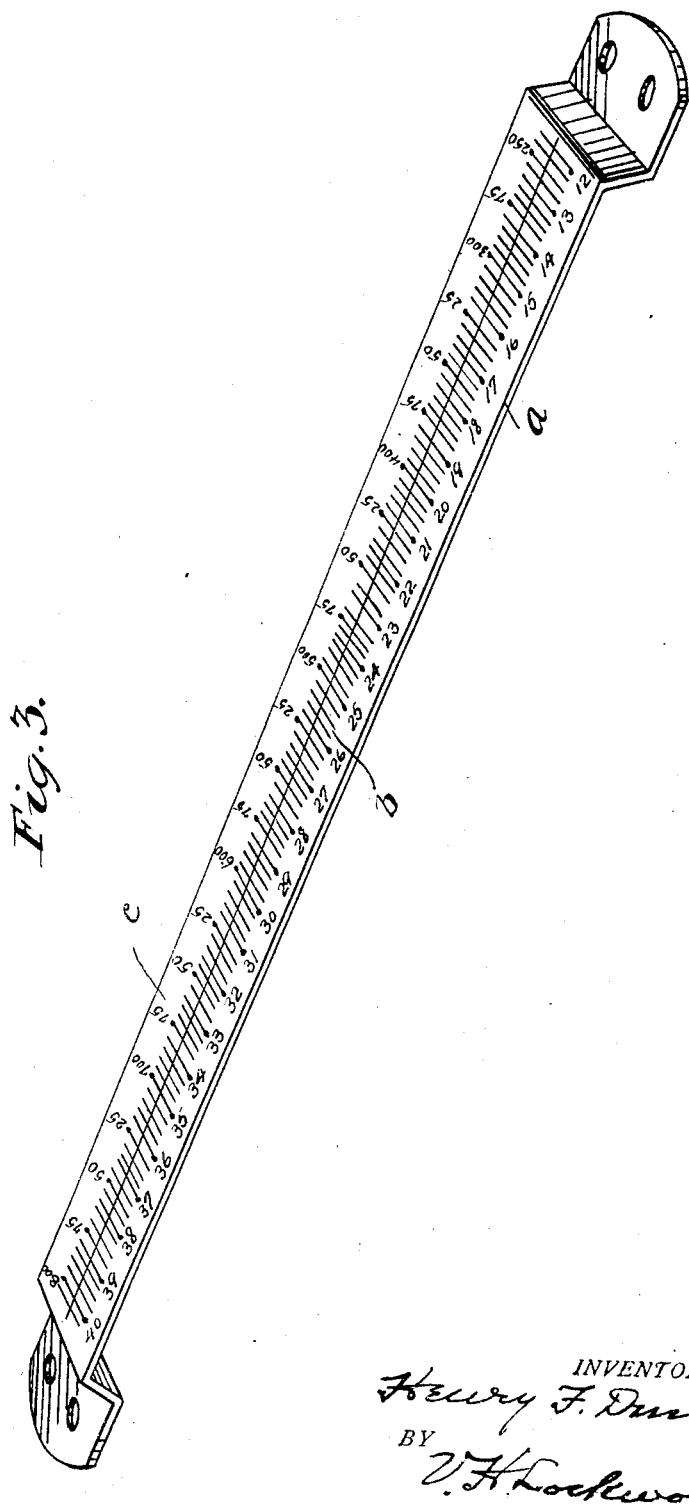

UNITED STATES PATENT OFFICE.

HENRY F. DUNN, OF ELWOOD, INDIANA, ASSIGNOR TO DUNN MANUFACTURING COMPANY, OF ANDERSON, INDIANA, A CORPORATION OF INDIANA.

COMPUTING DEVICE FOR CHEESE-CUTTERS.

No. 803,997.   Specification of Letters Patent.   Patented Nov. 7, 1905.

Application filed April 27, 1904. Serial No. 205,187.

*To all whom it may concern:*

Be it known that I, HENRY F. DUNN, a citizen of the United States, and a resident of Elwood, in the county of Madison and State of Indiana, have made a certain new and useful Invention in Computing Devices for Cheese-Cutters; and I declare the following to be a full, clear, and exact description of the same, such as will enable others skilled in the art to which it appertains to make and use the invention, reference being had to the accompanying drawings, and to letters and figures of reference marked thereon, which form a part of this specification.

The drawings show the invention in perspective view.

The invention has relation to certain new and useful improvements in computing devices designed to be used in connection with aliquot-part computing cheese-cutters having a table-rotating lever moving along a scale graduated for total weights of different cheeses, said scale having an adjustable stop for limiting the movement of said lever; and the invention has for its object the provision of improved means for locating the proper point upon the cheese-weight scale at which to set the adjustable stop, so as to cut portions of constant value from cheeses of different values.

With this object in view the invention consists in the novel construction and combination of parts, as hereinafter set forth.

Figure 1:
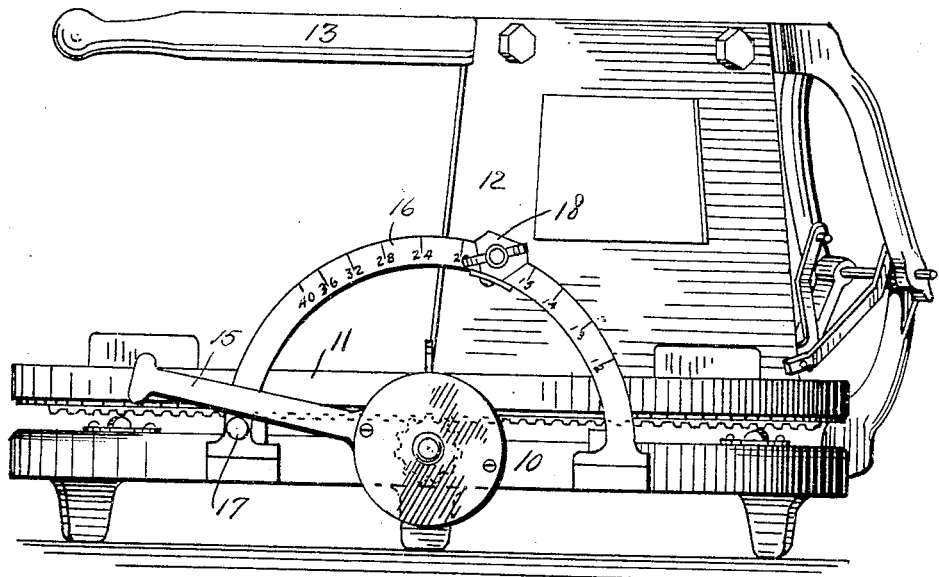
Figure 2:
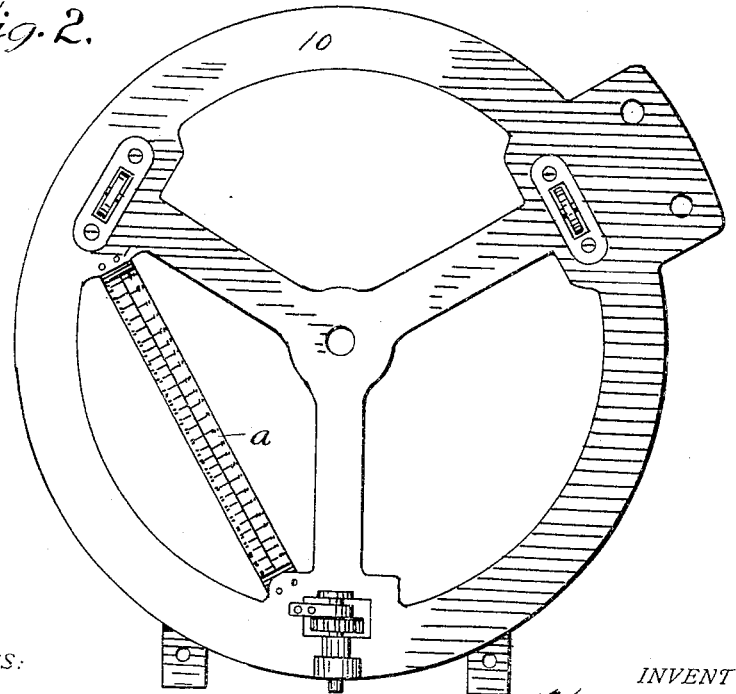

In the drawings, Figure 1 is a side elevation of a cheese-cutter of the kind referred to. Fig. 2 is a plan view of the base, showing the new scale-bar. Fig. 3 is a plan view, on an enlarged scale, of the scale-bar on the under side of the machine, shown in Fig. 2.

The cheese-cutter (shown herein for the purpose of illustrating the nature of the invention and its use) consists of the base 10, upon which there is mounted a rotary cheese-support 11, adapted to hold and carry the cheese that is to be cut into portions. Above it there is a vertically-swinging knife 12, secured to the handle-bar 13, that is hinged at the rear of the machine for the purpose of slicing the cheese.

The cheese-support 11 is rotated by a hand-lever 15 and intermediate gearing and mechanism between said hand-lever and cheese-support, which may be in any form desired, such as that shown in the patent to Frank P. Dunn, No. 790,564, May 23, 1905, "Cheese-cutter." A vertical arc-bar 16 is secured to the base alongside the path of movement of the lever 15. It has a permanent stop 17, and an adjustable stop 18 is slidably mounted on said arc-bar. These stops limit the throw of the lever 15, and therefore the extent of movement of the cheeses resulting from each complete throw of the lever 15.

In order to cut slices of equal weight from cheeses of varying weights, a scale of total weights of cheeses is provided on the vertical arc-bar to indicate the proper position of the adjustable stop to effect such result. Thus the weight-scale shown in the drawings runs from twelve to forty pounds. If the cheese to be cut weighs thirty pounds, the adjustable stop is located at the numeral "30" on the arc-bar and then slices of the same weight will be cut by each throw of the lever as would be cut from a cheese weighing fifteen pounds with the stop located at the numeral "15" on the scale. These weight-scale cheese-cutters are usually adapted to cut a quarter-pound at each throw of the lever.

The object of this invention is to combine with the foregoing cheese-cutter or any other cheese-cutter provided with a weight-scale another scale showing the total values of different cheeses alongside and in registration with a weight-scale corresponding substantially to the weight-scale on the arc-bar or other part of the cheese-cutter that controls the operation of the cheese-cutter. This other scale is shown in Fig. 3. Referring to Fig. 3, the letter *a* designates a scale-bar having marked thereon at one side thereof equally-spaced graduations *b* from "12" to "40," inclusive, and representing total weights of different cheeses, the spaces between said numbers being graduated for halves and quarters. Opposite these weight-graduations and on the other side of the scale-bar are equally-spaced total selling price or value graduations *c* from "240" to "800," inclusive. Other weights and selling prices can of course be used.

In use the total selling price or money value of the cheese to be vended is estimated and then found upon the scale *b*. The cheese weight upon scale *b* opposite the total selling price upon the scale *c* will indicate the proper point upon the weight-scale on the arc scale-bar 18 by which works the cheese-table-rotating lever 15 at which to set the adjustable stop 18 in order to cut pieces of cheese of a predetermined unit of value, such as five cents worth. It is obvious, therefore, that the scale-bar shown in Fig. 3 or a similarly-arranged scale-bar showing both weight and total value graduations may be attached to or combined with any cheese-cutter having a similar weight-scale for controlling its operation and by virtue of such combination cheeses may be cut into portions according to the value thereof and so that it will cut portions of constant value from cheeses of different value. In other words, this machine will cut the cheese into portions either according to the weight or according to the value, as the customer may order.

In using the cheese-cutter shown the cheese-support 11 is lifted up when the operator desires to see the scale-bar *a* below.

What I claim as my invention, and desire to secure by Letters Patent, is—

1. The combination with a cheese-cutter provided with a scale representing total weights of cheeses for regulating the operation thereof, of a scale-bar having on it substantially the same scale of total weights of cheeses as the scale that controls the operation of the cheese-cutter, and a scale representing total values of cheeses beside and registering with the total-weight scale on said scale-bar.

2. In a device for cutting cheeses or the like, a knife, a rotary cheese-support, a lever for actuating the cheese-support, a scale-bar on which said lever moves, said scale-bar being provided with a scale representing the total weights of cheeses, an adjustable stop on said scale-bar for limiting the operation of said lever, and another scale-bar being provided with a total-weight scale on it of substantially the same range as said last-mentioned total-weight scale, and a scale representing total values of cheeses located on said last-mentioned scale-bar beside and registering with the total-weight scale thereon.

3. A scale-bar having a scale thereon representing total weights of cheeses, and a scale representing total values of cheeses, said two scales being located beside each other and registering with each other.

4. A scale-bar having marked thereon, at one side thereof a scale of figures, representing total weights of cheeses, and gradually increasing from one end to the other of said bar, and at the other side thereof a scale of figures representing total selling prices and values of cheeses also increasing from one end to the other, and transverse graduated marks common to both of such scales of figures, substantially as specified.

In testimony whereof I affix my signature in presence of two witnesses.

HENRY F. DUNN.

Witnesses:
GEORGE P. LOUISO,
FRANK P. DUNN.